No. 741,425. PATENTED OCT. 13, 1903.
J. WILD.
DRAWING COMPASSES.
APPLICATION FILED JULY 13, 1903.
NO MODEL.

Witnesses:

Inventor:
Johann Wild.

No. 741,425. Patented October 13, 1903.

UNITED STATES PATENT OFFICE.

JOHANN WILD, OF SUHR, NEAR AARAU, SWITZERLAND, ASSIGNOR TO JOHANN BOSSART, OF BUCHS, NEAR AARAU, SWITZERLAND.

DRAWING-COMPASSES.

SPECIFICATION forming part of Letters Patent No. 741,425, dated October 13, 1903.

Application filed July 13, 1903. Serial No. 165,334. (No model.)

*To all whom it may concern:*

Be it known that I, JOHANN WILD, a citizen of the Republic of Switzerland, residing at Suhr, near Aarau, Switzerland, have invented new and useful Improvements in Drawing-Compasses, of which the following is a specification.

The present invention has reference to improvements in drawing-compasses, and relates more especially to a new construction of needle-point; and the object of the invention is to provide means whereby the needle-point may be moved axially within the leg of the compasses by turning a small worm-wheel.

Figure 1:
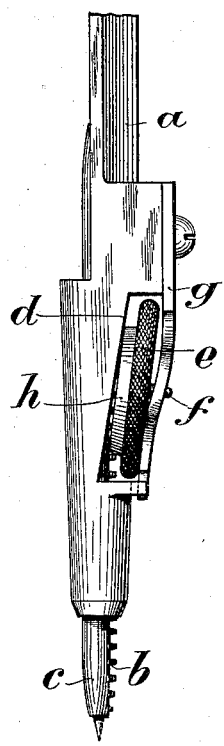
Figure 2:
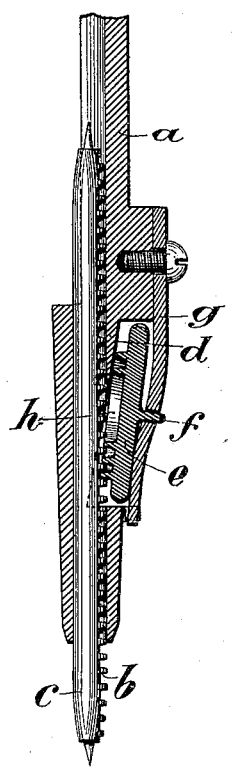
Figure 3:
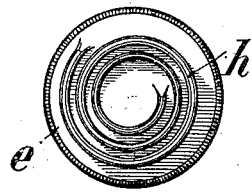

In order to make the invention more readily understood, I will describe it with reference to the accompanying sheet of drawings, Figure 1 of which shows a side elevation of the lower leg end of the compasses provided with my improvement. Fig. 2 is a sectional elevation thereof, and Fig. 3 shows a front elevation of the worm-wheel.

The letter of reference $a$ denotes the lower part of the leg of the compasses, within which slides the needle-point $c$, provided on one side with a toothed rack $b$. Within a recess $d$, covered by a plate $g$, is journaled a worm-wheel $e$ with a spirally-running worm $h$, a central trunnion $f$ engaging a corresponding journal-hole in the plate $g$. The worm-wheel being journaled at a slant relative to the needle-point, only its lower part engages the toothed rack, as clearly shown in Fig. 2. For altering the position of the needle-point within the leg the worm-wheel is rotated one way or the other, according to the desired direction of travel.

Having now particularly described and ascertained the nature of my said invention and in what manner the same is to be performed, I declare that what I claim is—

1. In drawing-compasses, the combination of the needle-point, adapted to slide within the leg of the compasses, a toothed rack on said needle-point, a worm-wheel adapted to mesh with the said toothed rack, and means for journaling said worm-wheel in the leg of the compasses, substantially as and for the purpose set forth.

2. In drawing-compasses, the combination of the needle-point, adapted to slide within the leg of the compasses, a toothed rack on said needle-point, a worm-wheel slantingly journaled within a recess in the leg of the compasses and meshing with said toothed rack, a plate covering the recess for said worm-wheel, and a central trunnion on said worm-wheel adapted to engage a corresponding journal-hole in said cover-plate, the parts being constructed, arranged and coöperating, substantially as and for the purpose set forth.

In testimony whereof I have signed my name to this specification in the presence of two subscribing witnesses.

JOHANN WILD.

Witnesses:
 MORITZ VEITH,
 A. LIEBERKNECHT.